No. 721,744. PATENTED MAR. 3, 1903.
P. G. RICHTER.
HYDROMETER.
APPLICATION FILED JAN. 2, 1902.
NO MODEL. 2 SHEETS—SHEET 1.
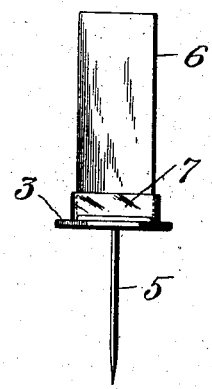
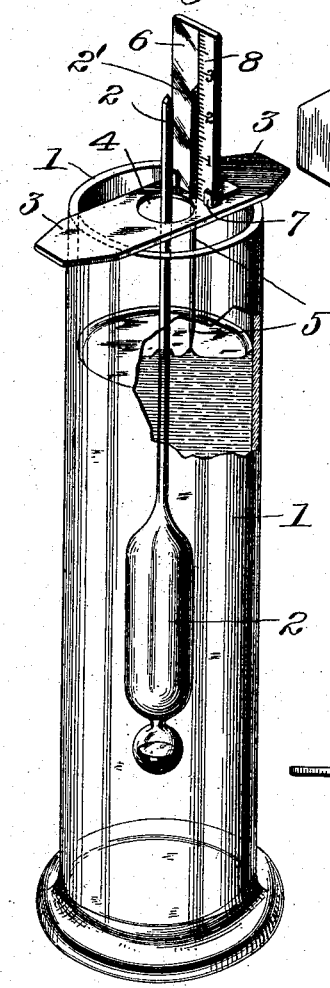
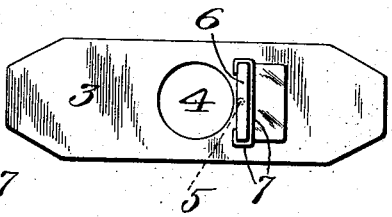
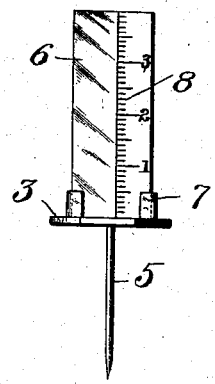
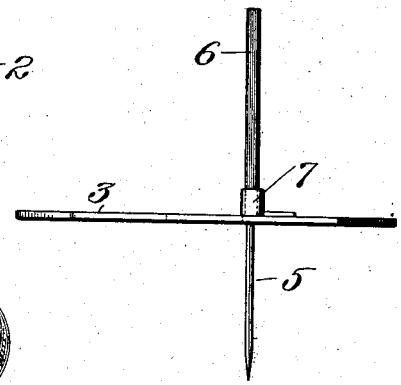
Witnesses:
Inventor:
Philipp George Richter,
by Caust Caur,
Atty's.

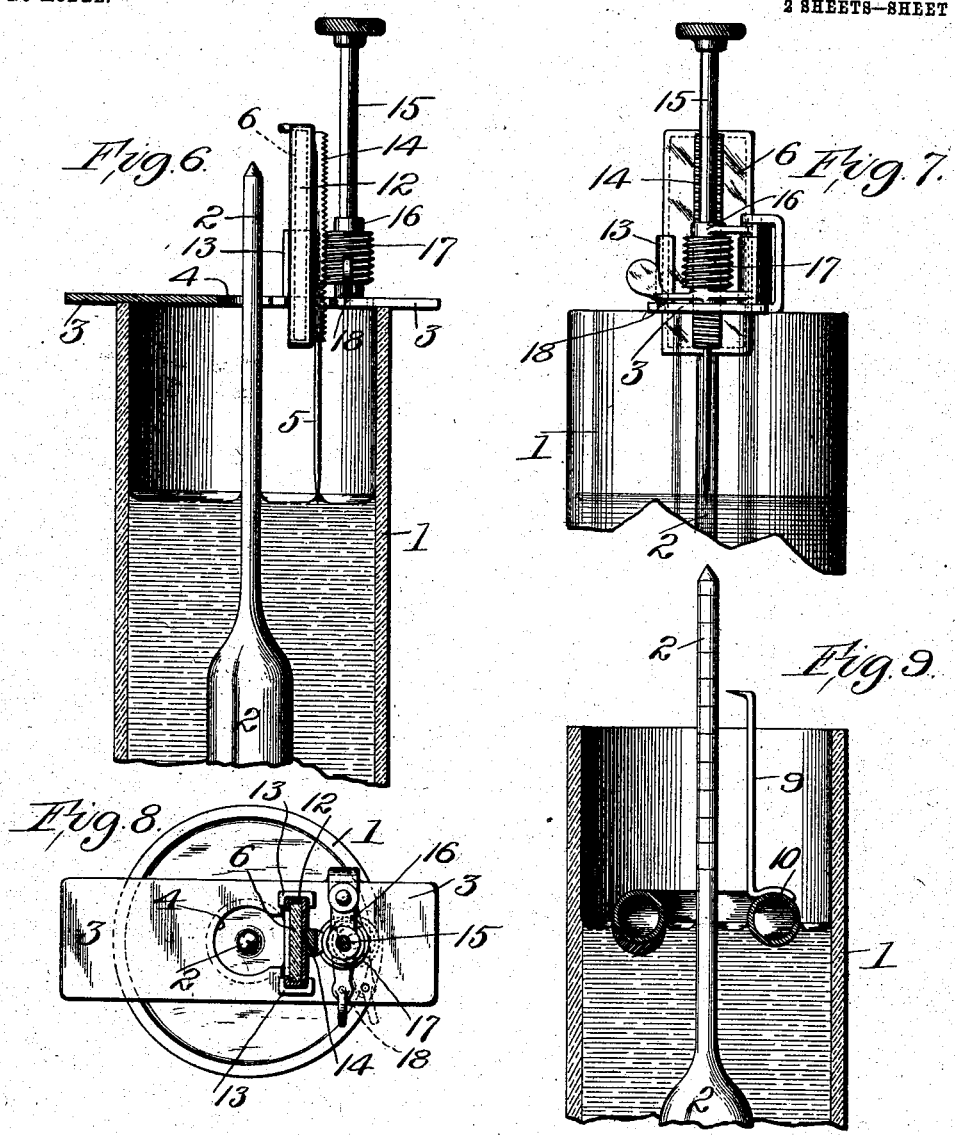

UNITED STATES PATENT OFFICE.

PHILIPP GEORGE RICHTER, OF ST. LOUIS, MISSOURI, ASSIGNOR OF ONE-HALF TO B. G. HARTMANN, OF ST. LOUIS, MISSOURI.

HYDROMETER.

SPECIFICATION forming part of Letters Patent No. 721,744, dated March 3, 1903.

Application filed January 2, 1902. Serial No. 88,208. (No model.)

*To all whom it may concern:*

Be it known that I, PHILIPP GEORGE RICHTER, a citizen of the United States, and a resident of the city of St. Louis and State of Missouri, have invented new and useful Improvements in Hydrometers, of which the following is a specification.

My invention relates to hydrometers, and has for its principal object to facilitate the accurate reading thereof.

To this end my invention consists in providing means for reading the hydrometer-scale above the meniscus formed by the liquid.

It also consists in a plate adapted to be mounted on the hydrometer vessel and provided on its under side with a downturned pin adapted to cause the formation of a meniscus at a predetermined level of the liquid and provided on its upper side with a suitable scale graduated with reference to such predetermined level.

It also consists in the arrangement and combination of parts hereinafter described and claimed.

In the accompanying drawings, which form part of this specification, and wherein like symbols refer to like parts wherever they occur, Figure 1 is a perspective view of my hydrometer. Fig. 2 is an elevation of my device detached from the hydrometer vessel and looking toward the rear of its mirror. Fig. 3 is a similar elevation looking toward the front of the mirror. Fig. 4 is a plan view of said device, and Fig. 5 is a side view of said device looking toward the edge of the mirror. Figs. 6 and 7 are views of a modification.

My hydrometer comprises a cylinder or other vessel 1 for containing the liquid whose specific gravity is to be measured and a float 2 of the usual type. The top of this cylinder or vessel 1 is arranged to be in a horizontal plane, and upon the top edge rests a plate 3 in a horizontal position. This plate 3 is provided with a hole 4 therein to allow the stem of the float to project through without interfering with the free movement thereof. This plate 3 is also provided with a pin 5 on its under side, which is rigidly fixed thereto and extends downwardly at a considerable distance from the wall of the cylinder. The upper side of said plate 3 is equipped with a vertically-arranged glass mirror 6, which is held in place by means of guides or socket-pieces 7, provided therefor on the upper side of said plate 3. This mirror 6 is also provided with a scale 8, which is preferably made of paper marked off in degrees conforming to the intended use of the hydrometer. As shown in Fig. 3, the hydrometer-scale 8 is marked off into equal degrees—as, for instance, into a millimeter-scale. For use as a saccharometer, alcoholometer, actinometer, or other purpose where the instrument is designed for testing special liquid solutions it is preferable to mark off the scale into divisions conforming to the respective elevations of the float for the various percentages of the particular liquid solution. The zero-point or origin of the scale is that point of the scale which is in the same horizontal plane with the top of the float-stem when the float is in a standard liquid whose surface is in the plane of the pin-point—that is to say, the scale is graduated with reference to a predetermined level of the liquid, and for purposes of comparison the liquid to be tested must be brought to the same level, which level is very accurately ascertained by means of the pin-point which forms, with the liquid, a conspicuous meniscus as soon as the liquid reaches the predetermined level.

The operation of the device is as follows: The cylinder 1 is partially filled with the liquid whose specific gravity is to be measured and the float 2 inserted therein. The top plate 3 is then mounted in a horizontal position on the top edge of the cylinder 1, and then more liquid is poured into the cylinder until the level of the liquid almost reaches the downturned point of the pin. Then more liquid is added drop by drop until the liquid reaches the level of the pin-point. When this level is reached, a meniscus immediately forms about the pin-point and is very conspicuous from above or through the glass wall of the cylinder above the liquid. In this way the level of the liquid is ascertained with extreme sensitiveness, and it only remains to read the scale as indicated by the top of the float.

The principal advantage of my device is its extreme sensitiveness, inasmuch as a single drop of liquid is enough to create a conspicuous meniscus. Another very important advantage is that the scale is read above the cylinder, so that there is nothing to prevent an accurate reading. This advantage is particularly important with reference to translucent and opaque liquids, for the usual hydrometer-scale is carried by the stem of the hydrometer-float, and in order to secure an accurate reading it is necessary on account of the meniscus formed about said stem to view the scale through the mass of the liquid, and as this is impossible with translucent and opaque liquids the hydrometer readings for such liquids are required to be corrected by various methods. Obviously my device admits of divers changes in construction without departing from my invention, and I do not wish to restrict myself to the construction hereinbefore described. For instance, a pin or pointer 9 may be mounted upon a float 10 specially provided therefor, so as to project above the level of the liquid. As shown in Fig. 9, this float 10 is preferably of annular shape and arranged to surround the stem of the main float 2. By this arrangement a scale on the float-stem may be used with greater accuracy than by the present method. For this purpose the length of the pin or pointer 9 above the level of the liquid must be deducted from the degree indicated thereby on the float-scale and the indication corrected accordingly.

In the modification shown in Figs. 6, 7, and 8 the pin 5 is movable vertically. As shown in the drawings, the scale 8 is rigidly connected with the pin and is graduated with reference to the point thereof; but obviously the scale may be fixed and the pin alone movable. The mirror 6 and scale 8 are carried in a frame 12, which slides in vertical guides 13 provided therefor and has a rack 14 fixed on its rear side. A vertical spindle 15 is journaled in a frame 16, which is pivotally mounted on the top plate 3. This frame is of any suitable construction. As illustrated in the drawings it comprises a vertical hub having two horizontal arms, through the ends of which the spindle 15 works. The hub is pivotally mounted in a bent plate provided for the purpose on top of the top plate 3. The spindle carries a screw 17, which engages and coöperates with the rack 14 to move the scale and pin minute distances. In order to move them greater distances, the spindle-carrying frame 16 is swung on its pivot to disengage the screw from the rack, whereupon the scale and pin may be raised or lowered by hand. The lower member 18 of the pivotal frame is made resilient or provided with a screw or clamp for binding it firmly against the top plate to hold it in place. Obviously the pin may be made movable by other devices than those illustrated. The advantages of the movable-pin construction are that is capable of use where the volume of liquid is limited and that it permits of the use of a micrometer-screw for lowering the point.

What I claim is—

1. A hydrometer comprising a liquid-containing vessel, a float therein, a pin projecting downwardly into said vessel and adapted to cause the formation of a meniscus in the liquid, and a scale graduated with reference to the point of said pin, substantially as described.

2. A hydrometer comprising a liquid-containing vessel and a float therein, and a pin projecting downwardly into said vessel and adapted to cause the formation of a meniscus in the liquid at a predetermined level thereof, and a scale graduated with reference to said predetermined level, substantially as described.

3. A hydrometer comprising a liquid-containing vessel and a float therein, and a pin projecting downwardly into said vessel and adapted to cause the formation of a meniscus in the liquid at a predetermined level thereof, and a scale for coöperating with said float, and having its graduations made with reference to said predetermined level of the liquid, substantially as described.

4. A hydrometer comprising a liquid-containing vessel and a float therein, and a plate adapted to be mounted above the liquid, said plate having a downturned pin adapted to cause the formation of a meniscus in the liquid at a predetermined level and said plate having also a scale adapted to coöperate with the stem of the float, said scale being graduated with reference to said predetermined level of the liquid, substantially as and for the purpose set forth.

5. A hydrometer comprising a liquid-containing vessel and a float, a plate adapted to be mounted horizontally above the liquid and having a scale arranged to coöperate with said float, said plate having a downturned pin, all substantially as and for the purpose set forth.

6. A hydrometer comprising a liquid-containing vessel, a float therein and a plate adapted to be mounted horizontally above the liquid and having a vertical mirror and a scale on said mirror adapted to coöperate with the stem of said float, said plate having a downturned pin adapted to cause the formation of a meniscus in the liquid at a predetermined level and said scale being graduated with reference to said predetermined level of the liquid, substantially as described.

St. Louis, Missouri, December 31, 1901.

PHILIPP GEORGE RICHTER.

Witnesses:
B. G. HARTMANN,
JAMES A. CARR.